(12) United States Patent
Klimt

(10) Patent No.: US 11,074,488 B2
(45) Date of Patent: Jul. 27, 2021

(54) WEARABLE DEVICE WITH ELECTRONICALLY-READABLE TAG

(71) Applicant: Tomas Francis Klimt, Melbourne (AU)

(72) Inventor: Tomas Francis Klimt, Melbourne (AU)

( * ) Notice: Subject to any disclaimer, the term of this patent is extended or adjusted under 35 U.S.C. 154(b) by 265 days.

(21) Appl. No.: 16/030,732

(22) Filed: Jul. 9, 2018

(65) Prior Publication Data

US 2020/0012912 A1 Jan. 9, 2020

(51) Int. Cl.
*G06K 19/07* (2006.01)
*G06F 1/16* (2006.01)

(52) U.S. Cl.
CPC ......... *G06K 19/0723* (2013.01); *G06F 1/163* (2013.01)

(58) Field of Classification Search
CPC .................... G06K 19/0723; G06K 19/045
See application file for complete search history.

(56) References Cited

U.S. PATENT DOCUMENTS

| | | | |
|---|---|---|---|
| 1,930,416 A | 10/1933 | Chauvot | |
| 5,402,095 A | 3/1995 | Janniere | |
| 6,366,538 B1 * | 4/2002 | Anderson | G04B 37/0016 368/10 |
| 6,447,140 B1 | 9/2002 | Lu | |
| 7,230,539 B2 | 6/2007 | Klein | |
| 7,535,365 B2 | 5/2009 | Sakama et al. | |
| 8,636,220 B2 | 1/2014 | Warther | |
| 8,651,346 B1 * | 2/2014 | Williams | A44C 5/003 224/219 |
| 8,674,835 B2 | 3/2014 | Klein | |
| 8,829,363 B2 | 9/2014 | Centner et al. | |
| 8,957,774 B2 | 2/2015 | Goldblatt | |
| 8,963,720 B2 | 2/2015 | Salour et al. | |
| 9,055,798 B2 | 6/2015 | Scicluna | |
| 9,429,991 B1 * | 8/2016 | Ruffing | G06F 1/163 |
| 2008/0238667 A1 | 10/2008 | Olson | |

(Continued)

FOREIGN PATENT DOCUMENTS

WO  WO 2015/028107 A1  3/2015

OTHER PUBLICATIONS

Serenity Caldwell, "Secret Apple Watch controls: How to use the Digital Crown and side button!", Sep. 16, 2017, https://m.imore.com/secret-apple-watch-controls-how-navigate-whats-your-wrist, retrieved: Jul. 25, 2018.

(Continued)

*Primary Examiner* — Laura A Gudorf
(74) *Attorney, Agent, or Firm* — Womble Bond Dickinson (US) LLP

(57) ABSTRACT

A wearable device including: a housing including a slot operable to contain an electronically readable tag or a transmitter; and a plurality of depressible buttons coupled to the housing, wherein depressing at least two of the plurality of depressible buttons in a predetermined order is operable to expose the electronically readable tag in or from the slot or is operable to activate the transmitter to transmit a signal. A method of exposing an electronically readable tag including; exposing an electronic tag contained in a housing of a wearable device by pressing a plurality of buttons coupled to the housing in a predetermined order; and exposing the electronic tag to a tag reader.

20 Claims, 11 Drawing Sheets

(56) References Cited

U.S. PATENT DOCUMENTS

| | | |
|---|---|---|
| 2014/0027521 A1 | 1/2014 | Pedicano et al. |
| 2014/0034250 A1 | 2/2014 | Weiss |
| 2014/0260424 A1 | 9/2014 | Warren |
| 2014/0339107 A1 | 11/2014 | Gelinotte et al. |
| 2015/0109106 A1 | 4/2015 | Gomez et al. |
| 2015/0109107 A1* | 4/2015 | Gomez ............. G06K 19/0723 340/10.1 |
| 2015/0348007 A1* | 12/2015 | Khan ................ G06Q 20/4018 705/44 |
| 2016/0196487 A1 | 7/2016 | Huynh |
| 2017/0076642 A1* | 3/2017 | Cyman, Jr. ........... G09F 3/0291 |
| 2020/0005113 A1* | 1/2020 | Schnippering ..... G06K 19/0723 |

OTHER PUBLICATIONS

"Coast Products, Inc., DX190" Knife Product Sheet describing the Double Lock feature, https://coastportland.com/product/dx190/, retrieved: Jul. 25, 2018.

"Elk Ridge Triple Lock Back Inlay Shield" Knife Product Sheet, https://www.amazon.ca/Elk-Ridge-Triple-Inlay-Shield/dp/B007FUX1MC, retrieved: Jul. 25, 2018.

Nathan Chandler, "What's the difference between RFID and NFC?" Mar. 7, 2012, HowStuffWorks.com. https://electronics.howstuffworks.com/difference-between-rfid-and-nfc.htm, retrieved: Jan. 16, 2018.

International Search Report and Written Opinion of the Searching Authority, dated Jun. 11, 2019, for International Application No. PCT/IB2019/051868.

* cited by examiner

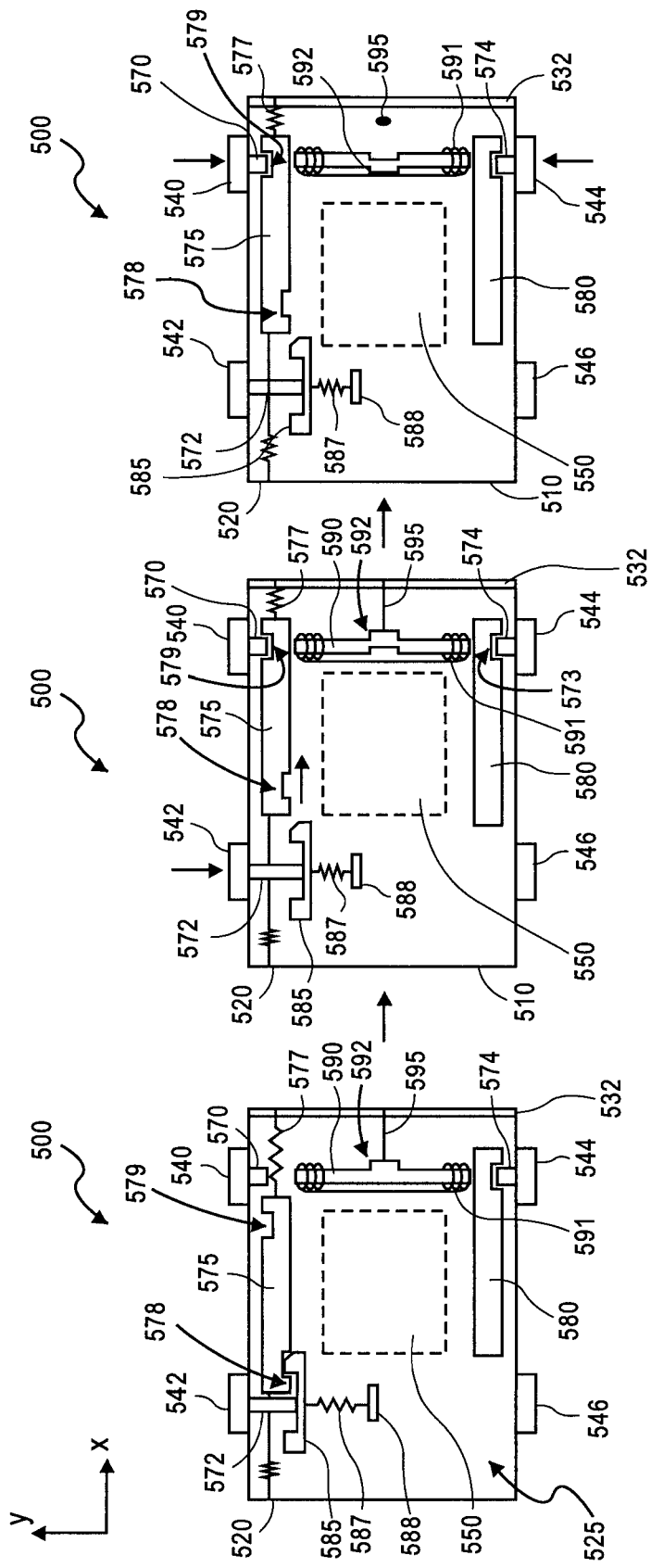

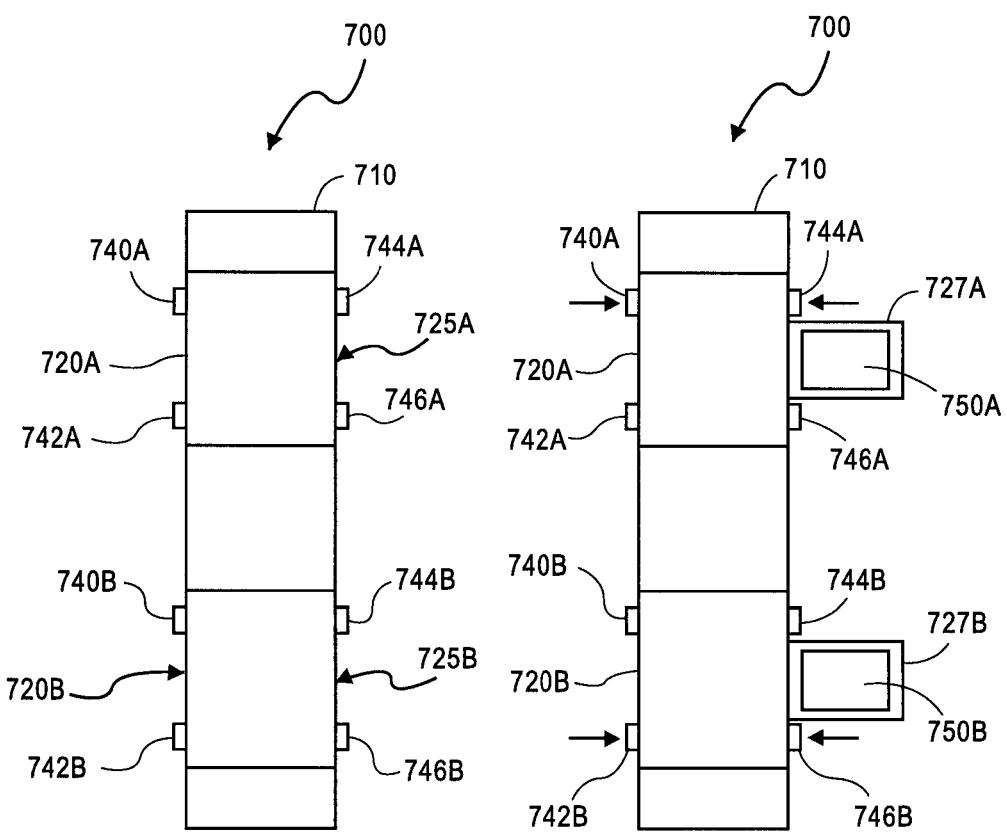
FIG. 10  FIG. 11

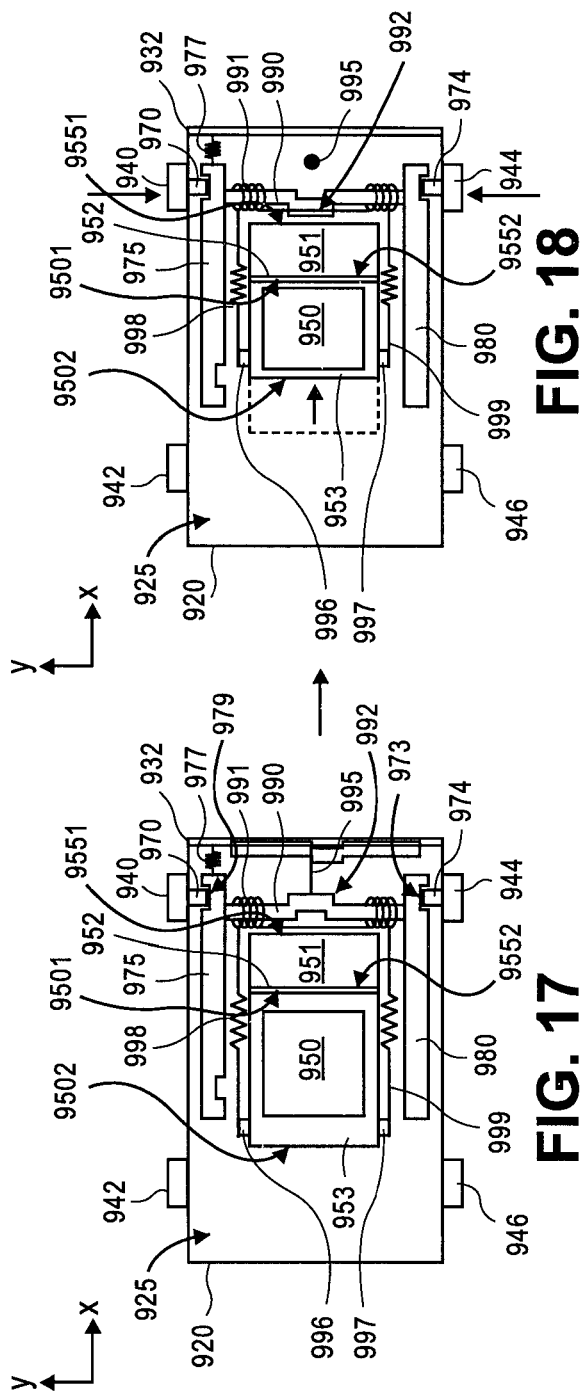
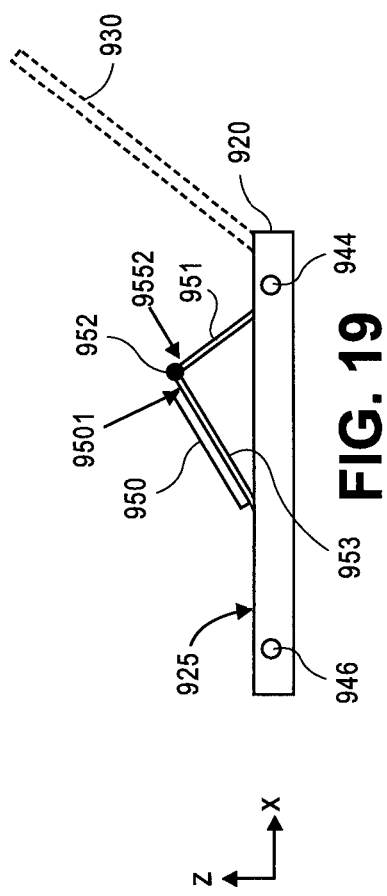

WEARABLE DEVICE WITH ELECTRONICALLY-READABLE TAG

FIELD

Electronically readable tags.

BACKGROUND

Electronically-readable tags such as a radio-frequency identification (RFID) or near field communication (NFC) tags or chips are used in numerous fields, including keyless access systems, contactless payment systems, and user identification. These electronically-readable tags, along with an antenna, are normally embedded into objects such as a card, key fob, or hand held device. Specific examples include credit cards, debit cards, passports, key fobs, smart cards, or other devices including smart phones and other mobile devices. An example use case is when a user wishes to enter a room (e.g., a hotel room), or make a payment in a store. A card with an electronically-readable tag may be held over a reader on the door or at the store that detects and scans the information within the tag. Although providing convenience (e.g., by allowing a user to pay for merchandise without removing a credit card from his/her wallet), there are still drawbacks. Namely, even though only the electronically readable tag is required to make a payment or open a door, a user is forced to carry the tag in another object (e.g., a credit card). Therefore, there is a need for a device that can securely carry one or more electronically-readable tags that allow a user to access (e.g., have a reader scan) the tag(s) when needed and protects the tag(s) from damage or from thieves using radio scanners when not in use.

BRIEF DESCRIPTION OF THE DRAWINGS

FIG. 6 shows an embodiment of a housing a wearable device operable to contain an electronically readable tag and having a mechanical system to expose the tag;

FIG. 7 shows the housing of FIG. 6 following the pressing of one button in a predetermined order of pressing a number of buttons on the housing;

FIG. 8 shows the housing of FIG. 6 and FIG. 7 following the pressing of two more buttons in a predetermined order of pressing a number of buttons on the housing;

FIG. 10 shows a side view of another embodiment of a wearable device that is a bracelet or wristband that includes two electronically-readable tags each tag contained in a slot in a side of the housing;

FIG. 11 shows the wearable device of FIG. 10 following the exposure of one of the electronically-readable tags from its slot;

FIG. 17 shows a top side view of another embodiment of a housing of a wearable device that includes an electronically-readable tag and a tag lifting mechanism wherein the electronically-readable tag is in a non-lifted position;

FIG. 18 shows a top side view of the embodiment of a housing of a wearable device of FIG. 17 with the electronically-readable tag is in a lifted position;

FIG. 19 shows a side view of the housing of FIG. 18;

DETAILED DESCRIPTION

Figure 1:
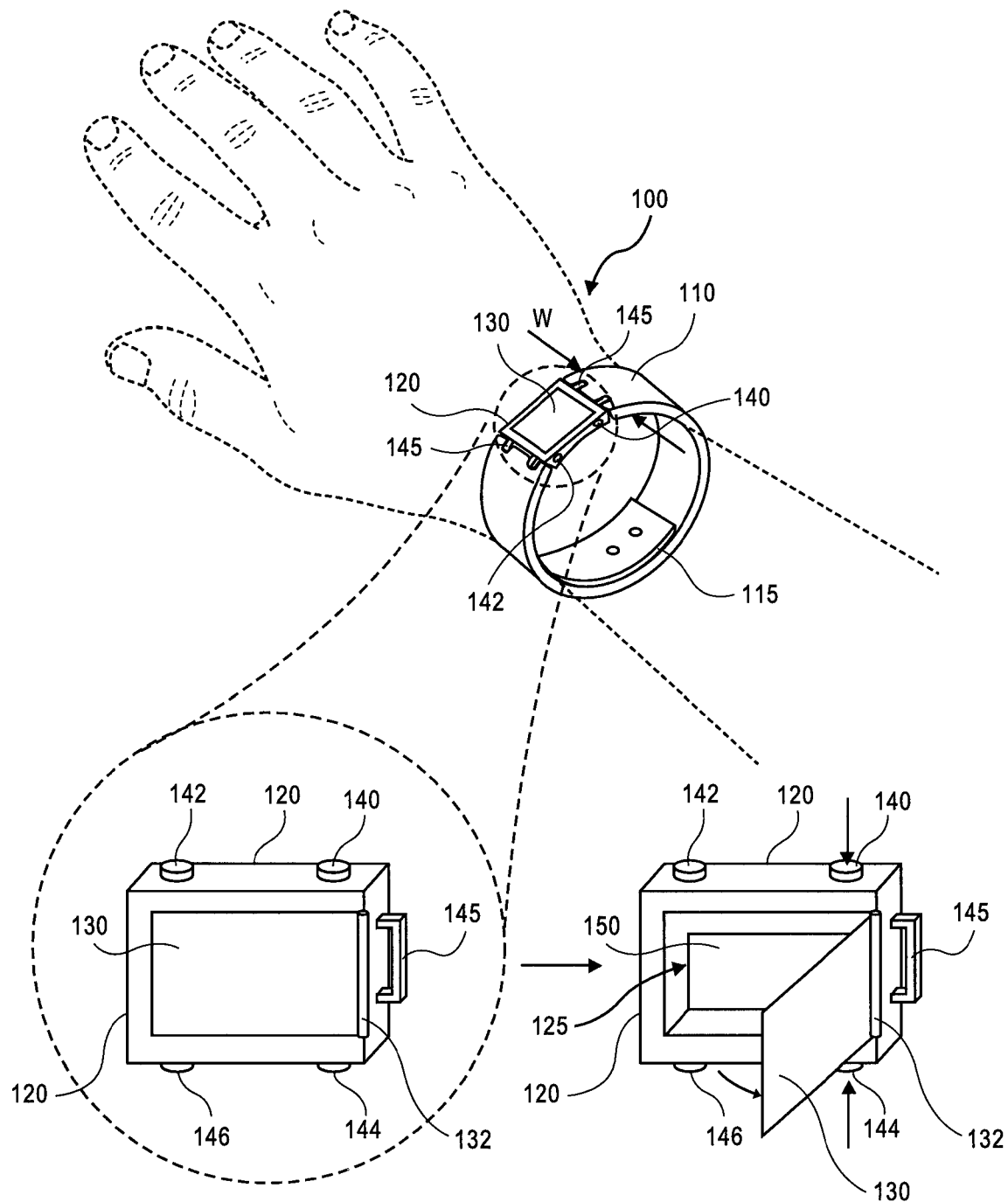
FIG. 1 shows a top side perspective view of an embodiment of a wearable device that is a bracelet or wristband that includes an electronically-readable tag in a slot of a housing that is operable to be covered by a door.

A wearable device that can securely store one or several electronically-readable tags such as RFID or NFC tag(s) that are protected while not being used by the user of the device is disclosed. In one embodiment, a wearable device includes a housing including a cavity or slot operable to contain an electronically-readable tag and a number of depressible buttons connected to the housing, wherein depressing the buttons is operable to expose the electronically-readable tag in or from the slot. Examples of wearable devices that can include such a housing or housings include, but are not limited to, a bracelet or wristband, a wristwatch, a pendant, and a key ring. In one embodiment, the wearable device may store a single electronically-readable tag and in another embodiment, the device may store two or more electronically-readable tags, for example, in individual housings. In one embodiment, a slot in a housing may be covered by a lid or a door, such as a hinged lid or door that is opened to expose the electronically-readable tag in the slot. In another embodiment, the electronically-readable tag may be connected to a tray in a slot where the tray is moved out of the slot to expose the tag from the slot. The housing may be made of or lined with a material that inhibits reading of the tag when the tag is not exposed. Suitable materials include, but are not limited to, a non-magnetic metal (e.g. aluminum) or a Faraday shielding fabric.

In one embodiment, a wearable device may include a single housing including a slot operable to contain an electronically-readable tag or a number of housings each operable to contain an electronically-readable tag. Representatively, a pendant that is operable to be pinned to a garment or connected to a chain may include a single housing operable to contain an electronically-readable tag; a key-ring may have several housings each operable to contain a separate electronically-readable tag, wherein the tags fan out from each other allowing a user to make a selection of a particular tag; a wristwatch may be operable to hold one or several electronically-readable tags within its band (e.g., a housing in a link of the band) and/or its case or bezel.

In one embodiment, a wearable device includes a number of depressible buttons coupled to a housing, wherein depressing at least two of the depressible buttons in a predetermined order is operable to expose an electronically-readable tag in or from a slot in the housing. In embodiments where the number of depressible buttons connected to a housing is two, the two buttons must be pressed in a predetermined order including, for example, simultaneously to expose an electronically-readable tag in or from the slot in the housing. In another embodiment, where the buttons must be depressed simultaneously, the buttons are pressed simultaneously to expose the electronically-readable tag in or from a slot and must remain pressed to keep the tag exposed. In another embodiment where there are more than two buttons connected to a housing, multiple ones of such buttons must be pressed in a predetermined order including, for example, two of the buttons pressed simultaneously to expose the electronically-readable tag or to expose the tag and maintain the tag exposed for reading or one button pressed followed by the pressing of two other buttons simultaneously.

FIG. 1 shows a top side perspective view of an embodiment of a wearable device. Wearable device 100 in this embodiment is a band such as a bracelet or wristband operable to be worn around a wrist or lower arm of a user. Band 110 may be made of leather, a metal or polymer (e.g., silicone) or a combination of metal and polymer. Band 110 may be a continuous loop that expands when a hand of a user is placed through the band or have two ends that come together and are mated with a clasp such as clasp 115. In one embodiment band 110 has a diameter to fit around a wrist of a user (wearer). Representatively, band 110 has a width, W, on the order of one inch or less (e.g., 0.5 inches) and a thickness on the order of 0.25 inches or greater. Housing 120 is connected to band 110. In this embodiment, housing 120 has a generally rectangular shape and includes a base and two pairs of opposing side walls that together define a cavity or slot operable to contain an electronically-readable tag therein. Housing 120 may be made of a material that inhibits reading of an electronically-readable tag that is contained in housing 120 or may be lined with such material via, for example, an adhesive. In one embodiment, housing 120 has width and depth dimensions similar to band 110.

In one embodiment, housing 120 is connected to two ends of band 110 (e.g., an end of two band portions if the band portions come together with a clasp to form a band) through a connector (e.g., connector 145) (see inset) on opposite side walls of housing 120 such as a hinge-type pin connector or decorative connector (e.g., connected split rings). In one embodiment, housing 120 is adaptable through connector 145 to be worn with different bands. Housing 120 also includes door 130 disposed over the cavity or slot of housing 120. In one embodiment, door 130 is hingedly connected to one side wall of housing 120 and operable to swing outward (upward) from housing 120 to expose the cavity or slot of the housing. An inset of FIG. 1 shows housing 120 in isolation. The left side depiction of housing 120 illustrates housing 120 with door 130 closed over the housing. A right side view of housing 120 shows a view of the housing with door 130 opened by the door pivoted or swung on hinge 132. The opening of door 130 exposes slot or cavity 125 in housing 120 and also exposes electronically-readable tag 150 disposed in slot 125. Electronically-readable tag 150 is connected to a base of housing 120.

The insets in FIG. 1 also show a number of depressible buttons connected to opposing side walls of housing 120. Specifically, FIG. 1 shows button 140 and button 142 connected to one side wall of the housing and button 144 and button 146 connected to an opposite side wall of the housing. In one embodiment, to open door 130 and expose electronically readable tag 150 requires the pressing of multiple buttons 140-146 in a predetermined order such as the simultaneously pressing of two buttons on opposite sides of housing 120, specifically in this example button 140 and button 142.

In the embodiment illustrated in FIG. 1, door 130 of housing 120 is visible on the outer or exposed portion of the wearable device, allowing door 130 to swing outward (upward) to expose electronically-readable tag 150. In another embodiment, housing 120 is connected to band 110 in a manner that it can slide on its base forward (toward a wearer's hand) or backward (toward a wearer's elbow) and be rotated to flip over on itself (e.g., rotate 180°). An example of a slide and flip mechanism is described in U.S. Pat. No. 1,930,416A of Chauvot, incorporated herein by reference. In this manner, electronically-readable tag 150 and door 130 remain protected and hidden while turned upside down (facing a wearer's wrist) and when it is desired for exposure, housing 120 can be flipped over. In another embodiment, a separate device such as a watch may be connected to housing 120 on a side opposite door 130 or housing may be sized to accommodate a slot or cavity for an electronically-readable tag on one side and another device such as a watch on an opposite second side. In still another embodiment, back-to-back housings (housing 120) can be connected together allowing two different electronically-readable tags or an electronically-readable tag and another device (e.g., a transmitter) to be worn on the wrist of a wearer. In a further embodiment, where back-to-back housings are connected together, one housing (housing 120) can contain an electronically-readable tag therein while a cavity or slot of another cavity has a volume operable to contain another item (e.g., physical identification, cash, etc.).

Figure 2:
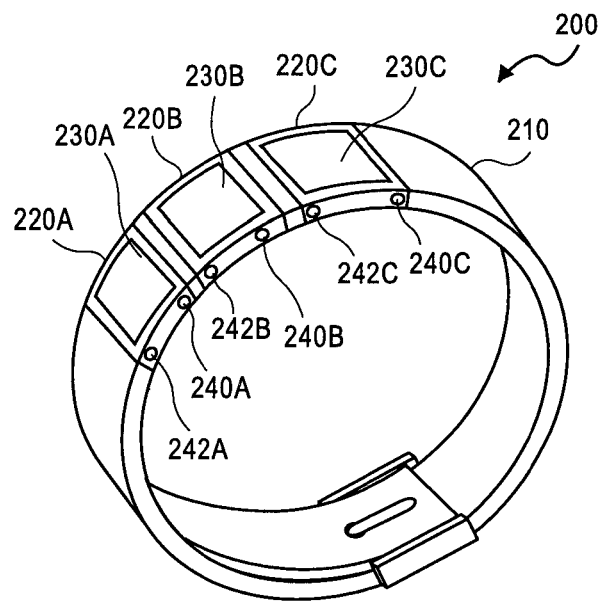
FIG. 2 shows a top side perspective view of another embodiment of a wearable device that is a bracelet or wristband that includes multiple electronically-readable tags wherein each of the multiple electronically-readable tags is contained in an unexposed position in an individual housing.
Figure 3:
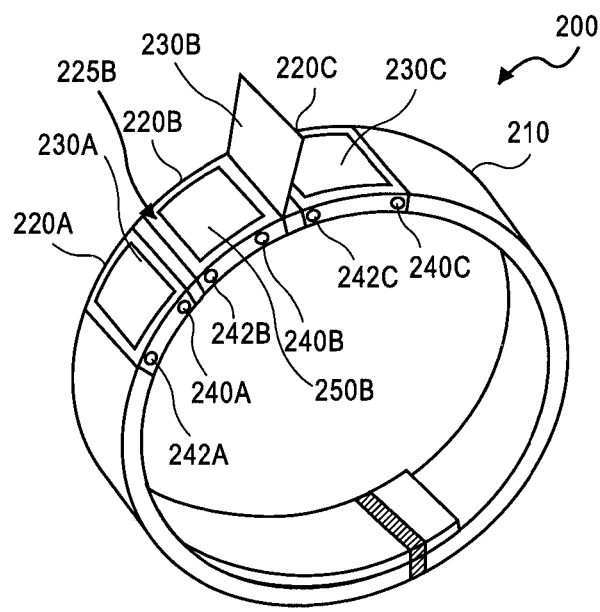
FIG. 3 show the wearable device of FIG. 2 following the exposure of one of the electronically-readable tags.

FIG. 2 and FIG. 3 show another embodiment of a wearable device operable to store multiple electronically-readable tags. In this embodiment, wearable device 200 is a band such as a wrist band or bracelet. Band 210 may be similar to band 110 in its dimensions and, in this embodiment, includes three housings with each housing including a slot operable to contain an electronically-readable tag with each housing including a number of depressible buttons connected thereto. One benefit of a wearable device such as device 200 that includes multiple electronically-readable tags is that tags of different purposes can be stored together on the same device and independently used as desired. For example, one tag might be for a credit card, another tag for a door entry and a third tag for a passport or other identification information. Referring to FIG. 2 and FIG. 3, band 210 includes housing 220A, housing 220B and housing 220C connected thereto. Each housing includes a cavity or slot therein to contain an electronically-readable tag such as described with respect to housing 120 in FIG. 1. Each cavity or slot, in this embodiment, is covered by a hinged door (lid or door) (door 230A on housing 220A; door 230B on housing 220B; and door 230C on housing 220C). FIG. 3 shows door 230B in an open position to expose electronically-readable tag 250B within slot 225B. Each door is individually opened by pushing or depressing at least two buttons that are connected to a respective housing. FIGS. 2 and 3 show depressible buttons connected to one side of each housing. Representatively, FIG. 2 and FIG. 3 shows buttons 240A and 242A connected to housing 220A; button 240B and button 242B connected to housing 220B; and button 240C and button 242C connected to housing 220C. It is appreciated that similar buttons may be connected to an opposite side and are obscured from view. In one embodiment, the buttons of one or more housings may be different from buttons of another housing. FIG. 2 and FIG. 3, for example, show buttons 240A and 242A of housing 220A are rectangular buttons; buttons 240B and 242B of housing 220B are hexagonal buttons and buttons 240C and 242C of housing 220C are circular buttons. The different shape of buttons may allow a user to distinguish one housing from another housing without looking at the wearable device. In another embodiment, the buttons of the different housings may have the same or different shapes as well as a different texture (e.g., smooth, rough, slotted). In a further embodiment, when multiple buttons on a housing must be pushed in a particular order to expose an electronically readable tag, individual buttons on a housing may have a different shape to allow a user, for example, to press the appropriate buttons based on a shape or feel of the buttons without looking at the wearable device.

Figure 4:
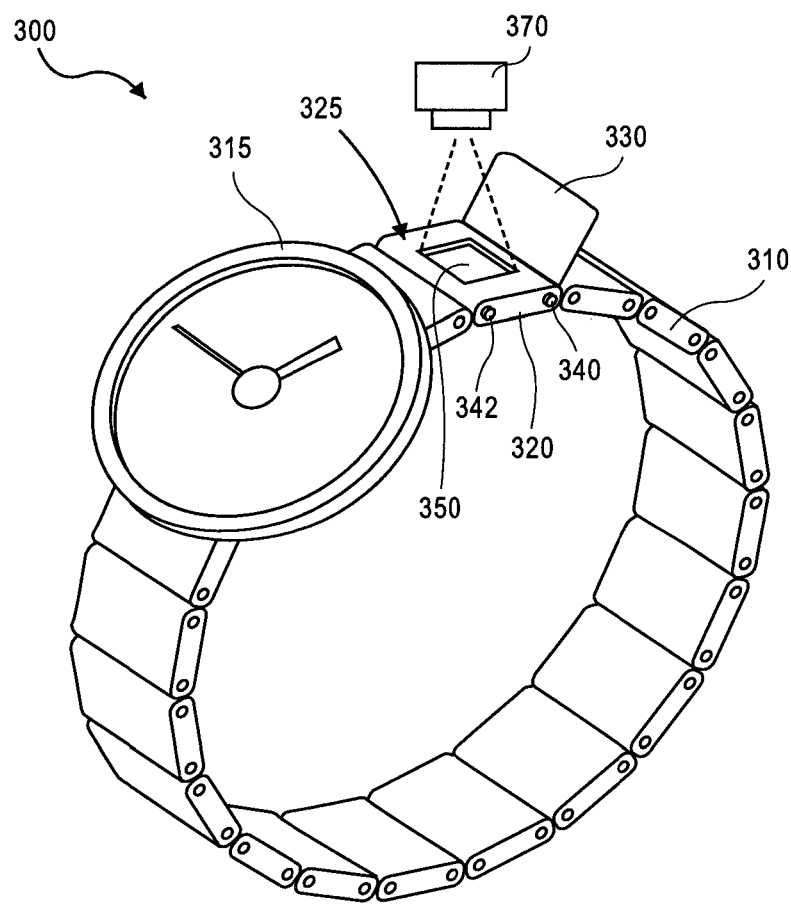
FIG. 4 shows a top side perspective view of another embodiment of a wearable device that is a wristwatch that includes an electronically-readable tag.

FIG. 4 shows another embodiment of a wearable device including a housing operable to contain an electronically readable tag therein. Device 300 in this embodiment is a wristwatch. Device 300 includes band 310 and bezel 315. Band 310 is composed of a number of links that are connected together in a conventional manner. One of the links of band 310 is replaced with housing 320 that has similar dimensions to a link. Housing 320 includes cavity or slot 325 operable to contain an electronically-readable tag. FIG. 4 shows electronically readable tab 350 contained in slot 325. Hingedly connected to housing 320 is door 330 having dimensions to cover slot 325. FIG. 4 shows door 330 in an open position to expose electronically-readable tab 350. Door 330 is opened by depressing or pushing at least two buttons connected to housing 320 in a predetermined order including, for example, two buttons simultaneously. FIG. 4 shows button 340 and button 342 on one side of housing 320. It is appreciated that additional buttons may be connected to an opposite side of the housing.

Figure 5:
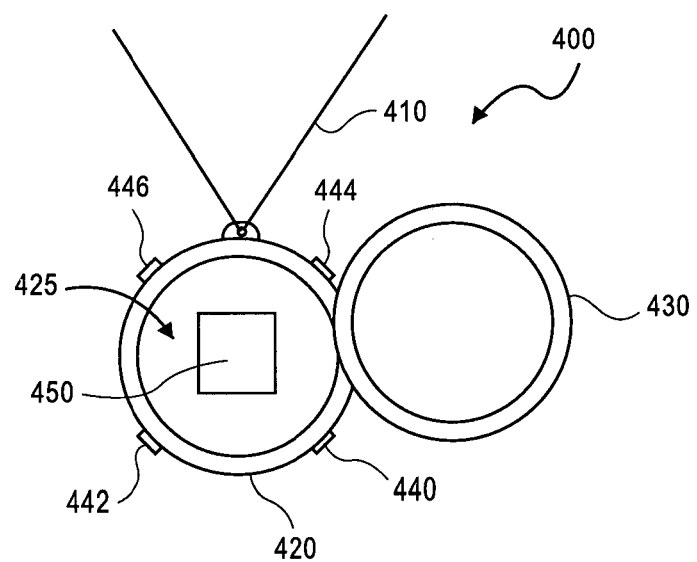
FIG. 5 shows a top side perspective view of another embodiment of a wearable device that is a pendant that includes an electronically-readable tag.

FIG. 5 shows another embodiment of a wearable device. In this embodiment, wearable device 400 is a pendant that is intended to be worn, for example, around a neck of a wearer or in a pocket of clothing of a wearer. In this embodiment, device 400 includes chain 410. Connected to chain 410 is housing 420 that is, for example, the bezel of the pendant. Housing 420 includes slot or cavity 425 that is operable to contain electronically-readable tag 450. Disposed over slot 425 is door 430. FIG. 5 shows door 430, that may include the jewelry or watch feature of the pendant. FIG. 5 shows door 430 in an open position exposing slot 425 and electronically readable tag 450. FIG. 5 also shows buttons 440, 442, 444 and 446 individually connected to housing 420. To open door 430 to expose electronically readable tag 450, in one embodiment, at least two of buttons 440-446 must be pressed in a predetermined order including, for example, simultaneously. It is appreciated that a watch bezel either as a pendant or in the form of a wristwatch (see FIG. 4) can serve as a housing and house an electronically-readable tag.

FIGS. 6-8 show an embodiment of a wearable device housing and illustrates one technique for mechanically opening a hinged door or lid by pressing a number of buttons in a predetermined order. The technique can be used in any of the embodiments described above with respect to FIGS. 1-5. Referring to FIG. 6, wearable device 500 includes housing 520 having button 540 and button 542 connected to one side of the housing and button 544 and button 546 connected to an opposite side of the housing. Housing 520 also includes a door that is not shown but would be connected to hinge 532 and swing open (upward) from a side opposite hinge 532. Disposed in slot or cavity 525 in housing 520 is electronically-readable tag 550 and a mechanical door opening system. In this embodiment, the mechanical door operating system requires that button 542 be initially pressed followed by the simultaneous pressing of button 540 and button 544 to open the door and expose electronically-readable tag 550. Mechanical door operating system includes pin 570 connected to button 540; pin 572 connected to button 542; and pin 574 connected to button 544. Pin 572 is connected to restraining bar 585 that has an inverted n-shape. A center point of restraining bar 585 is connected to tab 588 through spring 587. Restraining bar 585 is operable to move in a y-direction through the compression of spring 587 by pressing button 542.

The embodiment of a mechanical door operating system of FIGS. 6-8 also includes first lateral bar 575 and second lateral bar 580. Referring to FIG. 6, when the door is in a closed position, lateral bar 575 is positioned in slot 525 between pin 570 and pin 572. Lateral bar 575 includes notch 578 on one side that is aligned with one end of restraining bar 585 so that the end fits within notch 578 when button 542 is not pressed. Lateral bar 575 is connected to a side wall of housing 510 through spring 577.

FIG. 7 shows the mechanical door operating system when button 542 is pressed. Pressing button 542 causes pin 572 to move in a y-direction. Pin 572 forces restraining bar 585 to also move in a y-direction removing an end of restraining bar 585 from notch 578 in lateral bar 575. With restraining bar 585 removed from notch 578, lateral bar will move in a lateral or x-direction. In this embodiment, lateral bar 575 also includes notch 579 on a side opposite notch 578. Notch 579 is operable to line up with pin 570 following the x-direction movement of lateral bar 575. Lateral bar 580 includes notch 573 that is aligned with pin 574 connected to button 544. Disposed between lateral bar 575 and lateral bar 580 and aligned with pin 570 and pin 544, respectively, is post 590. Post 590 is surrounded by spring 591. Spring 591 is operable to twist post 590 when compressed. A midpoint of post includes tab 592. In FIG. 6 and FIG. 7, tab 592 is facing hinge 532. Connected to hinge 595 at a midpoint is torsion spring 595. FIG. 6 and FIG. 7 show one end of torsion spring 595 under tab 592 of post 590.

FIG. 8 shows the mechanical door operating system when button 540 and button 544 are pressed at the same time (simultaneously). In this embodiment, pressing button 540 and button 544 causes pin 570 and pin 574 to press on lateral bar 575 and lateral bar 580, respectively. Lateral bar 575 and lateral bar 580 compress spring 591 connected to post 590 and cause the post to rotate. Rotation of post 590 rotates tab 592 so that the tab no longer contains torsion spring 595. Torsion spring 595 thus rotates and causes hinge 532 to open the door and expose electronically-readable tag 550. In this embodiment, buttons 540 and 544 must remain depressed while the tag is read by a reader and to close the door. The door can be closed mechanically (e.g., by pushing with a finger). When the door is closed, an end of torsion spring 592 returns to its prior position. Buttons 540 and 544 are released causing tab 592 to catch the end of torsion spring 592 and retain the door in a closed position. Lateral bar 575 also then moves in an x-direction back to its position in FIG. 6.

Figure 9:
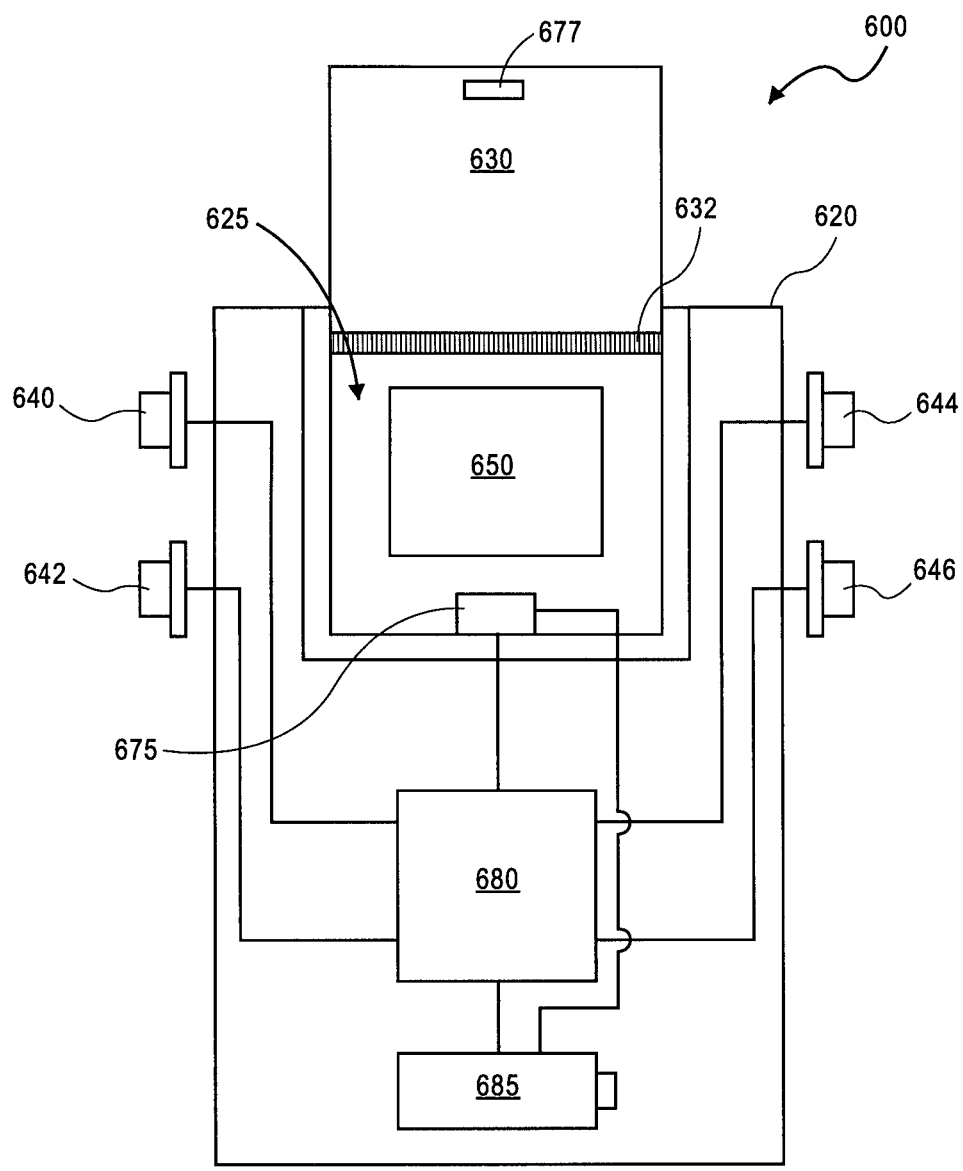
FIG. 9 shows an embodiment of a housing of a wearable device operable to contain an electronically readable tag and having an electromechanical system to expose the tag.

As an alternative to a mechanical door operating system such as described with respect to FIGS. 6-8, in another embodiment, an electromechanical operating system may be used to control the exposure of an electronically-readable tag in or from a slot of a housing in a wearable device. FIG. 9 shows one embodiment of a housing of a wearable device including an electromechanical operating system. The system or technique described can be used in any of the embodiments described above with respect to FIGS. 1-5. Referring to FIG. 9, wearable device 600 includes housing 620 having door 630 connected to hinge 632 to swing upward (outward) upon pressing two or more of button 640, button 642, button 644 and button 646 connected to sides of the housing. In FIG. 9, door 630 is shown in an open position to expose electronically-readable tag in slot 625. Also disposed in slot 625 or elsewhere in or on a wearable device is microprocessor 680 and power source 685 (e.g., a power source). Each of buttons 640-646 are connected to microprocessor 680 as is power source 685.

In this embodiment, door 630 is maintained in a closed position using an electromagnetic lock. FIG. 9 shows electromagnet 675 disposed in slot 625 and conductor connected to a backside of door 630. The opening of door 630 to expose electronically-readable tag 650 in or from slot 625 is controlled by microprocessor 680. In one embodiment, door 630 is opened by pressing two or more of buttons 640-646 in a predetermined order. For example, instructions embedded in microprocessor 680 cause the microprocessor to open door 630 in response to pressing button 642 followed by the simultaneous pressing of buttons 640 and 644. Door 630 swings on hinge 632 to open.

FIG. 10 and FIG. 11 show another embodiment of a wearable device including multiple electronically-readable tags. FIG. 10 shows wearable device 700 including bracelet or band 710. Disposed in band 710 is housing 720A and housing 720B. Each of housing 720A and housing 720B includes a cavity or slot operable to contain an electronically-readable tag. Housing 720A includes slot 725A and housing 720B includes slot 725B, with each slot formed through a sidewall of the housing. Housing 720A also includes button 740A, button 742A, button 744A and button 746A connected to opposing sidewalls of the housing and housing 720B includes button 740B, button 742B, button 744B and button 746B connected to opposing sidewalls of the housing. In this embodiment, slot 725A or housing is disposed through a sidewall between button 744A and button 746A and slot 725B or housing 720B is disposed through a sidewall between button 744B and button 746B.

In one embodiment, each of housing 720A and housing 720B is operable to expose an electronically-readable tag from a slot in the respective housing in response to pressing two or more buttons on the housing in a predetermined order. FIG. 11 representatively shows the simultaneous pressing of button 740A and button 744A or housing 720A and the simultaneous pressing of button 742B and button 746B of housing 720B. FIG. 11 shows electronically-readable tag 750A exposed from slot 725A of housing 720A and electronically readable tag 750B exposed from slot 725B of housing 720B. In this embodiment, electronically-readable tag 750A is connected to tray 727A and electronically readable tag 750B is connected to tray 727B. In one embodiment, each of tray 727A and tray 727B are operable to move out of slot 725A and slot 725B, respectively, by a spring mechanism or motorized mechanism in response to pressing of buttons on the side of a housing in a predetermined order.

Figure 12:
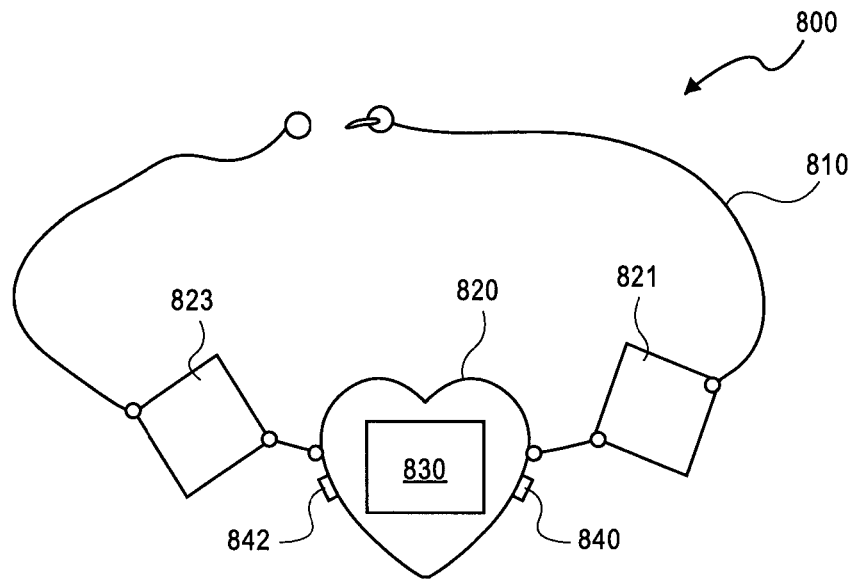
FIG. 12 shows a top side view of another embodiment of a wearable device that is a bracelet that includes an electronically-readable tag in a slot of a housing that is operable to be covered by a door.

FIG. 12 shows another embodiment of a wearable device. In this embodiment, wearable device 800 is a pendant that is intended to be worn, for example around a wrist of a wearer (user). In this embodiment, device 800 includes chain 810. Connected to chain 810 is housing 820 that is, for example, a pendant (e.g., a heart shaped pendant). Also connected to chain 810 in this embodiment are other pendants, such as pendant 821 on one side of housing 820 and pendant 823 on an opposite side. Housing 820 includes slot or cavity that is operable to contain an electronically-readable tag. Disposed over the slot or cavity of housing 820 in FIG. 12 is door 830. Door 830 conceals an electronically-readable tag within the slot or cavity of housing 820.

Figure 13:
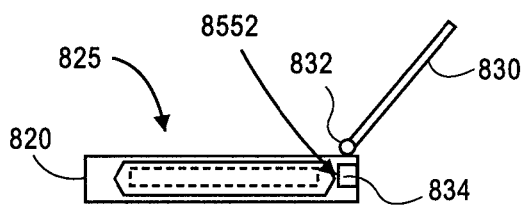
FIG. 13 shows a side view of the housing of FIG. 12 with the door in an opened position and shows the electronically-readable tag contained in a pouch.
Figure 14:
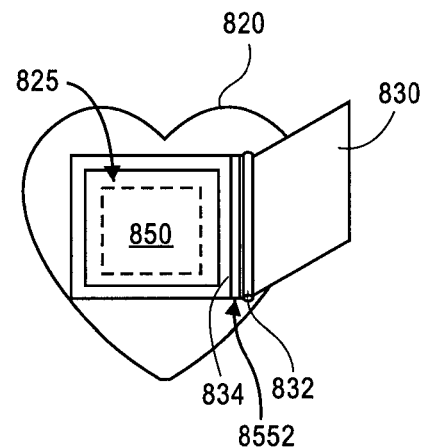
FIG. 14 shows a top view of the housing of FIG. 12 with the door in an opened position and shows the electronically-readable tag contained in a pouch.

FIG. 13 shows a side view of housing 820 with door 830 in an open position. FIG. 14 shows a top view of housing 820 with door 830 in an open position. Disposed within slot or cavity 825 of housing 820 is electronically-readable tag 850. In this embodiment, electronically-readable tag 850 is disposed in pouch 855. In one embodiment, pouch 855 is a single layer of, for example, aluminum foil. In another embodiment, pouch 855 may consist of multiple layers such as an aluminum layer and one or more polymer layers. Suitable bags or pouches for pouch 855 are commercially available from IMPAK Corporation of Los Angeles, Calif. In one embodiment, electronically-readable tag 850 is contained within pouch 855 and pouch 855 is sealed so as to inhibit damage to electronically-readable tag 850 from the elements (e.g., moisture). The sealed bag or pouch also provides an indication of whether or not electronically-readable tag 850 has been previously accessed or tampered with. For example, an electronically-readable tag such as electronically-readable tag 850 may come from a provider (e.g., credit card company, government agency, other entity) in sealed pouch 855. If, for example, upon arrival to an intended user/wearer of electronically-readable tag 850, pouch 855 is opened, the user/wearer will know that electronically-readable tag may have been accessed and/or tampered with.

Figure 15:
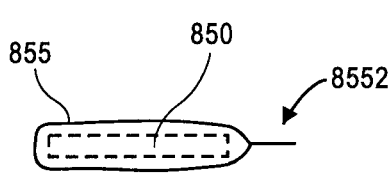
FIG. 15 shows a side view of the electronically-readable tag of the embodiment of FIG. 12 contained in a pouch.
Figure 16:
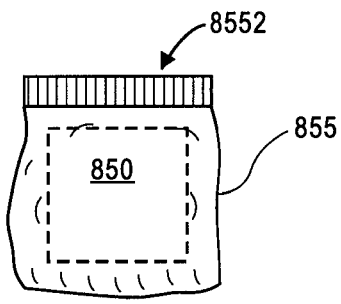
FIG. 16 shows a side view of the electronically-readable tag of the embodiment of FIG. 12 contained in a pouch.

FIG. 15 shows a side view of electronically-readable tag 850 disposed in pouch 855. FIG. 16 shows a top view of electronically-readable tag 850 disposed and sealed in pouch 855. Pouch 855, in this embodiment, is completely sealed at all edges. In one embodiment, pouch 855 includes lip 8552 at one end of the bag. Referring to FIG. 13 and FIG. 14, in one embodiment, lip 8552 allows pouch 855 to be secured within cavity 825 of housing 820. In one embodiment, lip 855 is secured under tab 834 in one end of housing 820. In one embodiment, tab 834 may be a bar that is disposed across a base of housing 820 in cavity 825 and disposed so as to have a gap or space below the bar through which tab 8552 of pouch 855 may be maneuvered (slipped).

In one embodiment, pouch 855 serves to secure electronically-readable tag 850 within a sealed environment. When electronically-readable tag 850 contained within pouch 855 is disposed in cavity 825 of housing 820, the electronically-readable tag may be accessed by opening door 830 of housing 820 by one or more of button 840 and button 842. Once door 830 is open, to access (e.g., read) electronically-readable tag 850, pouch 855 must open. Pouch 855 may be opened by a tearing mechanism such as with a sharp object including, for example, an end of another pendant on chain 810 as shown in FIG. 12 (pendant 821 or pendant 823).

FIGS. 17-19 show another embodiment of a wearable device housing that allows an electronically-readable tag contained therein to be raised in a praying mantis-type stance for easier access by a reader. In this embodiment, FIG. 17 may be used in connection with the mechanical door operating system of FIGS. 6-8 so certain similar components of that system are illustrated in FIG. 17 and others are not so as not to obscure the teachings of the tag lifting mechanism. Referring to FIG. 17, housing 910 includes button 940 and button 942 connected to one side of the housing and button 944 and button 946 connected to an opposite side of the housing. Housing 910 also includes a door that is not shown but would be connected to hinge 932 and swing open (upward) from a side opposite hinge 932. Disposed in slot or cavity 925 in housing 920 is electronically-readable tag 950 and a portion of a mechanical door opening system that may also serve as a tag lifting mechanism. In this embodiment, the tag lifting mechanism requires that button 940 and button 944 be simultaneously pressed just as button 540 and button 544 in the mechanical door operating system of FIGS. 6-8 were simultaneously pressed to open the door on housing 520. Tag lifting mechanism includes pin 970 connected to button 940 and pin 974 connected to button 944. The tag lifting mechanism also includes first lateral bar 975 and second lateral bar 980. First lateral bar 975 is positioned, in the embodiment in FIG. 17, with notch 979 lined up with pin 970. Similarly, second lateral bar 980 includes notch 973 aligned with pin 974. When button 940 and button 944 are pressed at the same time, pin 970 and pin 974 press on lateral bar 975 and lateral bar 980, respectively. First lateral bar 975 and second lateral bar 980 compress spring 991 connected to post 990 and cause the post to rotate. Rotation of post 990 rotates tab 992 so that the tab no longer contains torsion spring 995. Torsion spring 995 is allowed to rotate and causes hinge 932 to open the door on housing 920 (door not shown in FIG. 17 or FIG. 18). When the door is opened, electronically-readable tag 950 is exposed.

FIG. 18 also shows that depressing of button 940 and button 944 causes electronically-readable tag 950 to move within cavity 925. In one embodiment, a base of electronically-readable tag 950 is positioned in a tray. FIGS. 17 and 18 show a tray 952 to which electronically-readable tag 950 is connected (e.g., via a snap fit or other mechanism). One end of tray 953 is connected to flap 951 through hinge 952. Flap 951 includes side 951 that is fixedly connected to a base of housing 920 so that side 9551 cannot move. Opposing side 9552 of flap 9551 that is coupled to hinge 952 is movable in an x- and z-direction as is tray 953. Flap 951, in one embodiment has a thickness dimension and a length dimension similar to tray 953. In this embodiment, flap 951 has a width dimension that is less than a width dimension of tray 953. Each of tray 953 and flap 951 may be made of a durable material such as a hard polymer or metal.

In this embodiment, tray 953 includes tab 996 and tab 997 on respective opposite sides (top and bottom sides as viewed). Coupled between tab 996 and post 990 is spring 998 and connected between tab 997 of electronically-readable tag 950 and post 990 is spring 999. As post rotates with the pressing (e.g., simultaneous pressing) of button 940 and button 944, the rotation of bar 990 will pull or move tray 953 in an x-direction (left to right direction as viewed). Electronically-readable tag 950 seated on tray 953 will similarly move. FIG. 18 shows the device after electronically-readable tag 950 has moved. Since side 9551 of flap 951 is fixed to a base of housing 920, side 9501 of electronically-readable tag 950 and side 9552 of flap 951 are lifted or raised (moved upward out of slot or cavity 925 (out of the page)) with hinge 952. Side 9502 of electronically-readable tag 950 remains in cavity 925. FIG. 19 shows a side view of the device of FIG. 18 and illustrates electronically-readable tag 950 in a lifted or raised position from cavity 925 of housing 920. In this raised position, electronically-readable tag 950 may be more accessible to an electronic reader to read information from the tag. Following releasing of button 940 and button 944, electronically-readable tag 950 will return to its original position shown in FIG. 17 (generally parallel with a base of housing 920) as door 930 is closed. It is appreciated that the direction to which the electronically-readable tag lifts (an xz direction in FIGS. 17-19) may be changed by, for example, orienting tray 953, flap 951 and springs 998 and 999 in a different direction.

Figure 20:
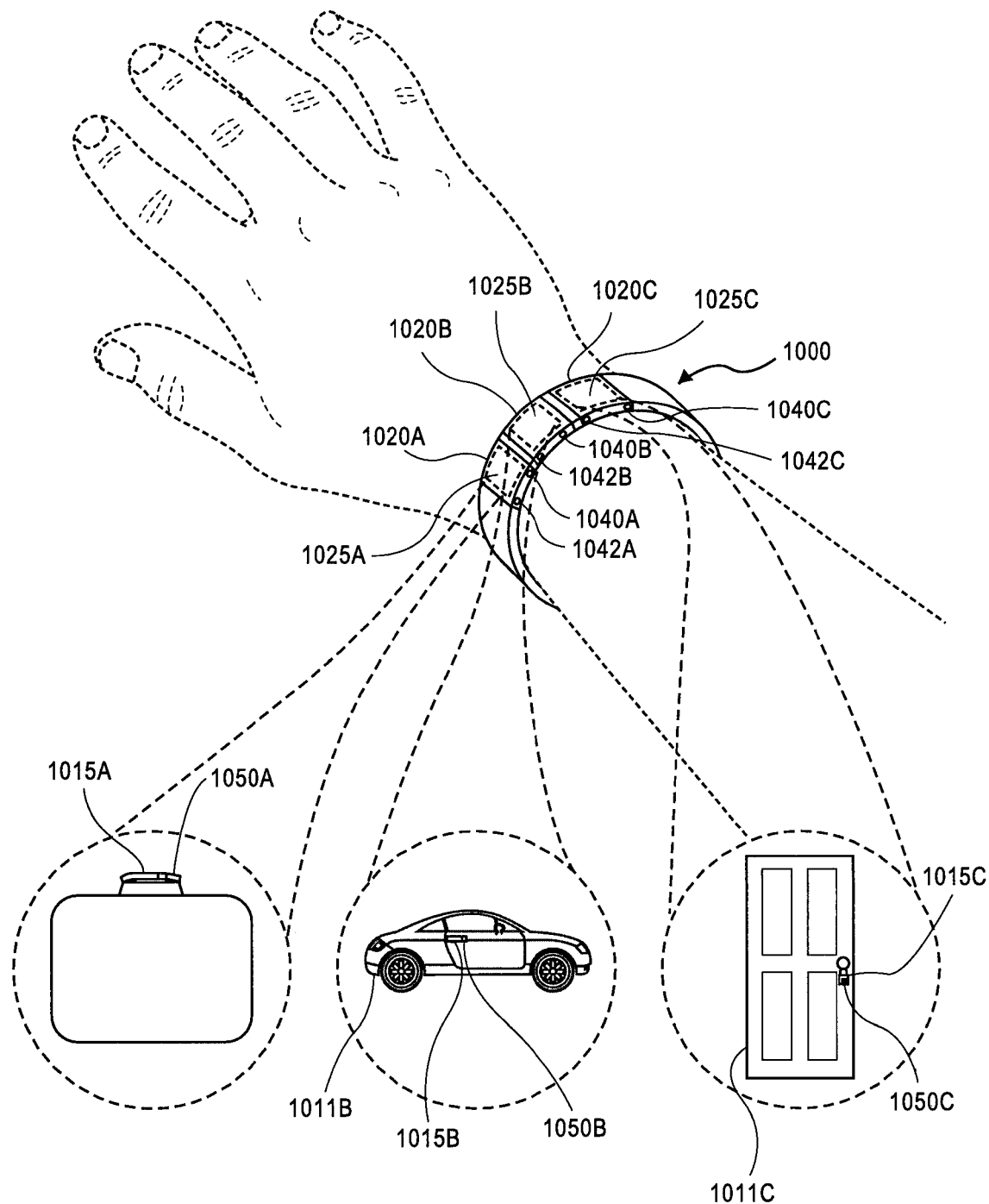
FIG. 20 shows an embodiment of a wearable device that includes one or more transmitters for transmitting a signal to a receiver associated with an object.

In the above embodiments, a wearable device included an electronically-readable tag representatively contained in a housing. In another embodiment, a wearable device can include a transmitter that emits a signal that is operable to be received by a receiver on another object (e.g., an electronically-readable tag). FIG. 20 shows an embodiment of a wearable device operable to store multiple transmitters wherein each of the multiple transmitters are operable to transmit a signal to a respective receiver. In this embodiment, wearable device 1000 includes a band such as a wrist band or bracelet. Band 1010 may be similar to band 210 or band 110 in its dimensions and, in this embodiment, includes three housings with each housing including a slot or cavity operable to contain a transmitter such as a radio frequency transmitter and an antenna with each housing including one or more depressible buttons connected thereto to activate the respective transmitter. Although a wearable device with three transmitters is shown, in another embodiment, one or more of the transmitters may be replaced with an electronically-readable tag thereby providing a device that is both active (e.g., a housing with a transmitter) and passive (e.g., a housing with an electronically-readable tag).

Referring to FIG. 20, band 1010 includes housing 1020A, housing 1020B and housing 1020C connected thereto. Each housing includes a cavity or slot therein to contain, in this embodiment, a transmitter and antenna. Each cavity or slot may be covered by a lid or door such as a hinged door as described above with respect to for example, FIG. 2 and FIG. 3. FIG. 20 also shows depressible buttons connected to one side of each housing. Representatively, FIG. 20 shows buttons 1040A and button 1042A connected to a housing 1020A; button 1040B and button 1042B connected to housing 1020B; and button 104C and button 142C connected to housing 1020C. It is appreciated that similar buttons may be connected to an opposite side of each housing and are obscured from view. Pressing one or more buttons on each housing may open a door to expose a transmitter therein to allow, for example, replacement or tuning of the transmitter.

In the embodiment presented in FIG. 3, wherein the wearable device includes three individual transmitters, each transmitter may be utilized to perform a specific task. In one embodiment, each transmitter is used to unlock a lock on an object. FIG. 20 shows transmitter 1025A in housing 1020A that is operable to transmit a signal to receiver 1050A that may be associated with a lock on a suitcase or briefcase. Transmitter 1025B is housing 1020B is operable to transmit a signal to receiver 1050B that is associated with a car door lock 1015 of car 1010B. Transmitter 1025C in housing 1020C is operable to transmit a signal to receiver 1050C associated with door lock 1015C of door 1010C. In one embodiment, each signal sent by transmitter 1025A, 1025B and 1025C to their respective receivers provides for the unlocking of the lock associated with the object. Each transmitter may be activated to transmit its respective signal by pushing one or more of the buttons associated with the housing (e.g., at least two buttons) in which case one or more buttons of a housing are electronically connected to a transmitter therein. Such button pressing may be in a particular order as described above with reference to FIG. 1.

Figure 21:
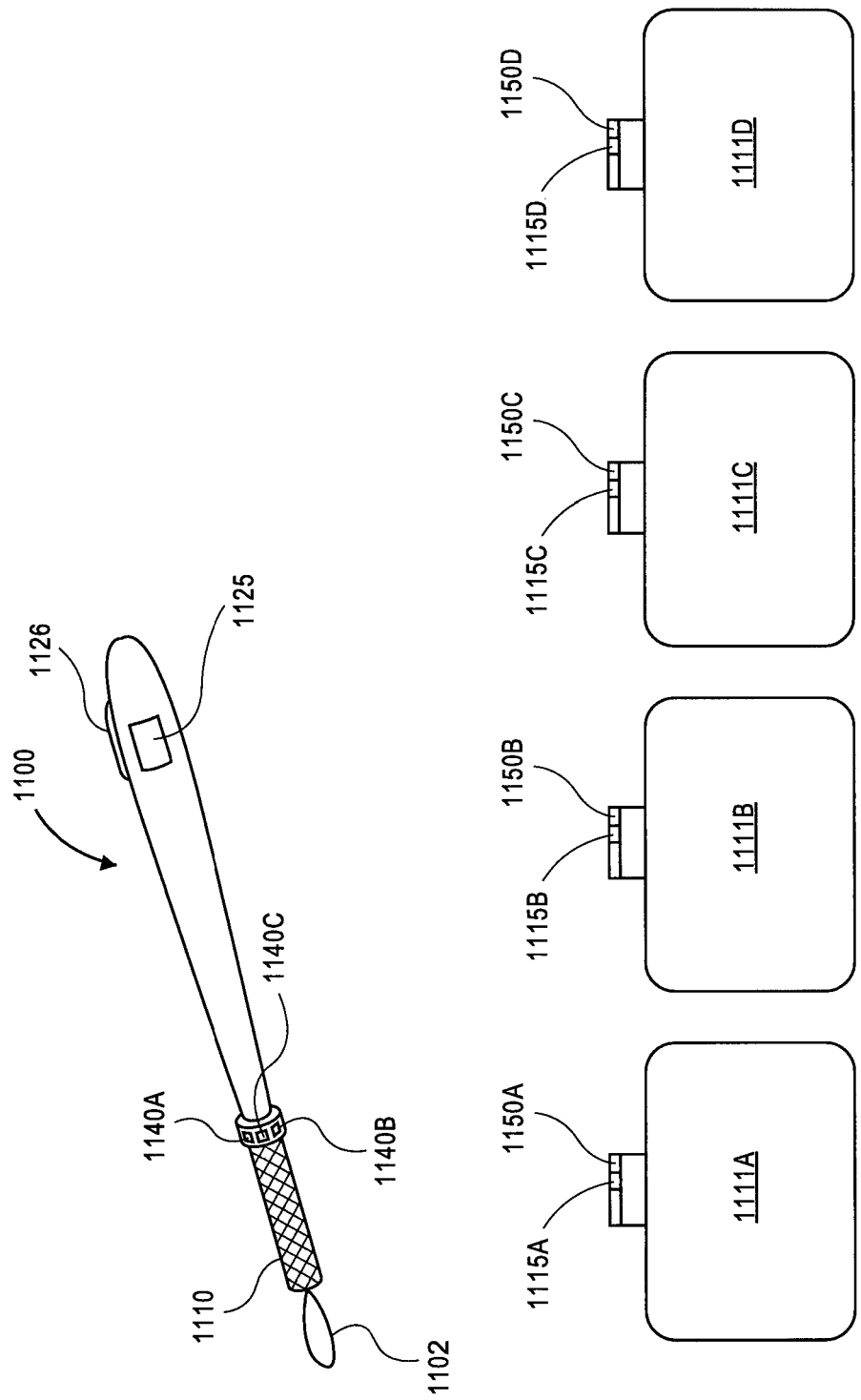
FIG. 21 shows an embodiment of a wearable device that includes a transmitter operable to transmit a master signal to open luggage locks of multiple pieces of luggage.

Commercial aircraft travel often requires travelers to check luggage (e.g., suitcases) for transportation in the hold of an aircraft or baggage car of a passenger train. Many countries have adopted standards with respect to locking such luggage such that only certain types of locks are acceptable and security administrations such as the Transportation Security Administration (TSA) has master keys to such locks allowing locked luggage to be opened by security personnel. Unfortunately, information about physical master keys used by security administrations has become known allowing, for example, thieves to copy the keys and thus have access to others' luggage. FIG. 21 illustrates device that includes a transmitter such as a radio frequency transmitter to communicate with a receiver in a lock of a suitcase or other luggage that allows the opening of the lock. Thus, the device in FIG. 21 replaces a manual or physical master key that is currently used by security administrations. Referring to FIG. 21, in one embodiment, device 1100 is a wand that may be a hand-held wand with optional tether 1102 that allows the wearing of device 1100 on, for example, the wrist of a security administration official. Wand 1110 includes transmitter 1125 that is, for example, a radio frequency transmitter. Wand 110 also includes antenna 1126 and one or more depressible buttons (e.g., button 1140A, button 1140B and button 1140C). One or more buttons 1140A-1140C may be connected to transmitter 1125 to activate the transmitter. In one embodiment, a security administration official armed with device 1100 (e.g., carrying the device) can wave the device in the vicinity of locked luggage and luggage containing a receiver (e.g., a radio frequency receiver) tuned to receive signals from transmitter 1125 is/are operable to unlock in response to such signals. FIG. 21 shows luggage 111A including lock 1115A and receiver 1150A; luggage 111B including lock 1115B and including receiver 1150B; luggage 111C including lock 1115C including receiver 1150C; and luggage 111D including lock 1115D including receiver 1150D. Each receiver may also include an antenna associated therewith. In one embodiment, each of receiver 1150A, 1150B, 1150C and 1150D are tuned to receive the same signal transmitted by transmitter 1125. This allows a security official to unlock multiple locks by transmitting the signal in the direction of multiple pieces of luggage without having to manually open each lock one at a time.

Figure 22:
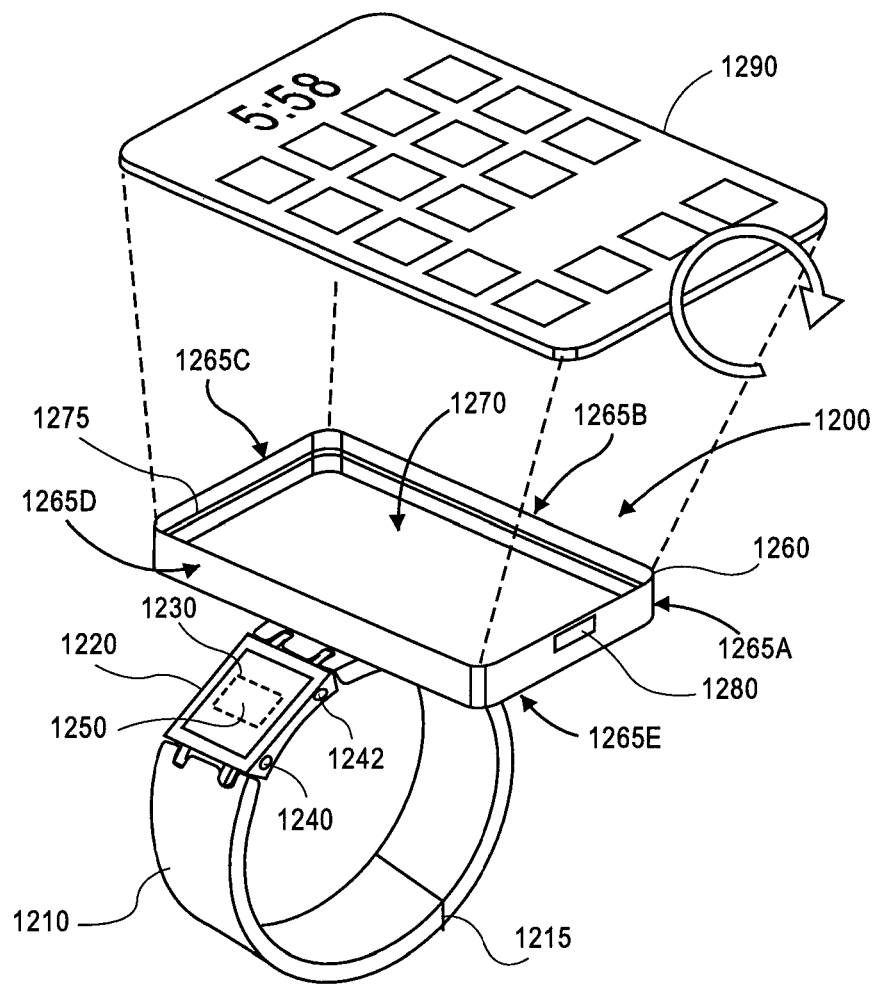
FIG. 22 shows an embodiment of a wearable device including a first housing including an electronically-readable tag therein and a second housing for a device.

FIG. 22 shows another embodiment of a wearable device. In this embodiment, the wearable device includes an electronically-readable tag representably contained in a housing and a separate housing for another device. Referring to FIG. 22, the figure shows wearable device 1200 that includes band 1210 such as a wrist band or bracelet. Band 1210 optionally has two free ends that may be connected by clasp 1215. Band 1210 may be similar to band 210 or band 110 in its dimensions and, in this embodiment includes housing 1220 connected at opposite sides to band 1210. Housing 1220 includes door 1230 disposed over a cavity or slot of the housing. In one embodiment, door 1230 is hingedly connected to one sidewall of housing 1220 and operable to swing outward (upward) from housing 1220 to expose the cavity or slot of the housing. Disposed within the cavity or slot of housing 1220 is electronically-readable tag 1250. The exposure of electronically-readable tag 1250 in housing 1220 is controlled in one embodiment by depressible buttons connected to opposing sidewalls of housing 1220. The operation of the buttons (e.g., button 1240, button 1242) may be similar to that described above with reference to FIGS. 1-9.

In the embodiment shown in FIG. 22, wearable device 1200 includes a second housing for another device. FIG. 22 shows housing 1260 connected to band 1210. In this embodiment, housing 1260 is defined by sidewalls 1265A, 1265B, 1265C and 1265D and base 1265E. Base 1265E is secured to band 1210 by, for example, an adhesive or a physical fastener(s) (e.g., a rivet). A width of band 1210 may be expanded to more closely match a length dimension of housing 1260 (defined by sidewalls 1265B and 1265D) or a separate band may be added so that a width of band 1210 and a width of another separate band more closely match a length dimension of housing 1260. Representatively, housing 1260 has a size to accommodate a smart device, such as a mobile phone therein. Representatively sidewalls 1265A-1265D and base 1265E define cavity 1270 such that device 1290 can be seated or nested securely therein. In one embodiment, disposed along an inner wall of sidewalls 1265A-1265D is gasket material 1275 such as a polymer gasket that provides a seal between device 1290 and housing 1260 to inhibit, for example, moisture or other debris from getting inside cavity 1270. FIG. 22 shows that device 1290 can be inserted into cavity 1270 of housing 1260 in a manner that a screen of device 1290 is exposed or that a screen of the device is concealed. In another embodiment, where device 1290 has screens on opposing sides, device 1290 may be flipped to expose the desired screen. Representatively, one screen may allow a wearer to access work or business information and another screen on an opposite side may allow a wearer to access personal information. In the embodiment shown in FIG. 22, cavity 1270 may be sized to accommodate not only device 1290 therein but cavity 1270 may have an additional depth dimension to accommodate other articles such as cash, a driver's license, or other identification underneath device 1290. Representatively, once device 1290 is seated in cavity 1270 of housing 1260, the device may be securely held by gasket 1275 and the dimensions of the housing. To remove the device from housing 1260, one or more depressible buttons 1280 may be pressed to extend a protrusion under device 1290 to lift an end of the device from cavity 1270. Alternatively, removal of device 1290 may be accomplished by depressing multiple buttons such as in a manner described above with reference to FIGS. 6-9, so that device 1290 can be maintained in housing 1260 in a more secure manner.

In one embodiment, device 1290 includes one or more transmitters, where each transmitter is operable to emit a signal that can to be received by a receiver associated with another object. Representatively, device 1290 such as a smart device includes at least one radio frequency transmitter (e.g., one, two, three transmitters) and an antenna(s). A radio frequency transmitter of the device may be programmed to perform a specific task such as emit a signal that is operable to direct the locking or unlocking of a lock on another object through the pressing of a key or keys on the smart device. In the example presented in FIG. 21, for example, where security personnel are required to open luggage for inspection, a radio frequency transmitter associated with device 1290 may be a "master key" that is operable to direct or cause the unlocking of one or more luggage locks. A security administration official wearing wearable device 1200 including device 1290 can direct the transmission of the radio frequency signal at locked luggage (e.g., one or more pieces of luggage each including a lock that when deployed prevents the opening of the luggage) by pressing key(s) or button(s) on device 1290, and the locked luggage including a receiver to receive the radio frequency signal will respond by unlocking the luggage. In this manner a security administration official wearing device 1200 including device 1290 has the ability to unlock multiple pieces of luggage through the transmission of a single signal. Alternatively, where different luggage locks are operable to receive or respond to different radio frequency signals, device 1290 includes multiple radio frequency signal transmission capability allowing the official to direct one or more different signals to unlock the luggage.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A wearable device comprising:
   a housing comprising a slot operable to contain an electronically readable tag or a transmitter and a door having a first position that covers the slot and a second position that exposes the slot; and
   a plurality of depressible buttons coupled to the housing, wherein depressing at least two of the plurality of depressible buttons in a predetermined order is operable to expose the electronically readable tag in or from the slot or is operable to activate the transmitter to transmit a signal.

2. The wearable device of claim 1, wherein the electronically readable tag is operable to be exposed only while two of the plurality of depressible buttons are depressed simultaneously.

3. The wearable device of claim 2, wherein the two of the plurality of depressible buttons operable to expose the electronically readable tag only while depressed simultaneously are a first of the plurality of depressible buttons and the plurality of depressible buttons comprises at least one second of the plurality of depressible buttons, wherein the electronically readable tag is operable to be exposed only while the first of the plurality of depressible buttons are depressed provided the at least one second of the plurality of depressible buttons is depressed before depressing of the first of the plurality of depressible buttons.

4. The wearable device of claim 1, wherein the electronically readable tag comprises a first position contained in the slot and a second position at least partially extending from the slot.

5. The wearable device of claim 1, wherein the housing comprises a plurality of slots therein, each of the plurality of slots operable to contain an electronically readable tag and wherein depressing at least a first two of the plurality of depressible buttons exclusively exposes a first electronically readable tag in or from a first of the plurality of slots and depressing at least a second two of the plurality of depressible buttons exclusively exposes the second electronically readable tag in or from a second of the plurality of slots.

6. The wearable device of claim 1, wherein the wearable device comprises at least two housings and each of the at least two housings comprises a slot and a plurality of depressible buttons, wherein a first of the at least two housings comprises an electronically readable tag and a second of the at least two housings comprises a transmitter.

7. The wearable device of claim 1, wherein the electronically readable tag is a radio frequency identification tag.

8. The wearable device of claim 1, wherein the electronically readable tag is a near field communication tag.

9. The wearable device of claim 1, wherein the housing comprises a wrist band.

10. The wearable device of claim 6, wherein the wrist band comprises a plurality of links and ones of the plurality of slots are in ones of the plurality of links.

11. The wearable device of claim 1, wherein the housing comprises jewelry.

12. The wearable device of claim 1, wherein the electronically-readable tag or transmitter is contained in a pouch.

13. The wearable device of claim 1, wherein the electronically-readable tag has a first position in the housing and a different second position wherein the electronically-readable tag is raised.

14. A method of exposing an electronically readable tag comprising:
    exposing a first electronically readable tag or a second electronically readable tag contained in a housing of a wearable device by pressing a plurality of buttons coupled to the housing in a predetermined order, wherein exposing the first electronically readable tag comprises pressing a first pair of the plurality of buttons simultaneously and exposing the second electronic tag comprises pressing a second pair of the plurality of buttons simultaneously; and
    exposing the electronic tag to a tag reader.

15. The method of claim 14, wherein prior to pressing the first pair or the second pair of the plurality of depressible buttons simultaneously, exposing the first electronically readable tag or the second electronically readable tag comprises pressing at least one other of the plurality of depressible buttons.

16. The method of claim 14, wherein prior to exposing the first electronically readable tag or the second electronically readable tag to a tag reader, the first electronically readable tag or the second electronically readable tag is raised in the housing.

17. A wearable device comprising:
a housing comprising a slot operable to contain an electronically readable tag or a transmitter; and
a plurality of depressible buttons coupled to the housing, wherein depressing at least two of the plurality of depressible buttons in a predetermined order is operable to expose the electronically readable tag in or from the slot or is operable to activate the transmitter to transmit a signal, and wherein the housing is operable to be rotated to flip over.

18. The wearable device of claim 17, wherein the electronically readable tag is operable to be exposed only while two of the plurality of depressible buttons are depressed simultaneously.

19. The wearable device of claim 18, wherein the two of the plurality of depressible buttons operable to expose the electronically readable tag only while depressed simultaneously are a first of the plurality of depressible buttons and the plurality of depressible buttons comprises at least one second of the plurality of depressible buttons, wherein the electronically readable tag is operable to be exposed only while the first of the plurality of depressible buttons are depressed provided the at least one second of the plurality of depressible buttons is depressed before depressing of the first of the plurality of depressible buttons.

20. The wearable device of claim 17, wherein the electronically readable tag is a radio frequency identification tag or a near field communication tag.

* * * * *